United States Patent
Burnett et al.

(10) Patent No.: US 7,260,718 B2
(45) Date of Patent: *Aug. 21, 2007

(54) METHOD FOR ADDING EXTERNAL SECURITY TO FILE SYSTEM RESOURCES THROUGH SYMBOLIC LINK REFERENCES

(75) Inventors: Rodney Carlton Burnett, Austin, TX (US); Timothy Simon Bartley, West Burleigh QLD (AU); Michael Powell, Carrara QLD (AU)

(73) Assignee: International Business Machines Corporation, Armonk, NY (US)

( * ) Notice: Subject to any disclaimer, the term of this patent is extended or adjusted under 35 U.S.C. 154(b) by 1018 days.

This patent is subject to a terminal disclaimer.

(21) Appl. No.: 09/843,072

(22) Filed: Apr. 26, 2001

(65) Prior Publication Data

US 2002/0162013 A1 Oct. 31, 2002

(51) Int. Cl.
*H04L 9/00* (2006.01)
(52) U.S. Cl. .......................... 713/167; 713/164; 726/2; 726/3; 709/229; 707/9
(58) Field of Classification Search .................... 707/9; 713/167, 164; 726/2–3, 4
See application file for complete search history.

(56) References Cited

U.S. PATENT DOCUMENTS

| | | | | |
|---|---|---|---|---|
| 5,479,612 A | * | 12/1995 | Kenton et al. | 726/5 |
| 5,649,200 A | * | 7/1997 | Leblang et al. | 717/122 |
| 5,832,527 A | * | 11/1998 | Kawaguchi | 707/205 |
| 6,006,018 A | * | 12/1999 | Burnett et al. | 709/219 |
| 6,321,219 B1 | * | 11/2001 | Gainer et al. | 707/3 |
| 6,327,703 B1 | * | 12/2001 | O'Donnell et al. | 717/162 |
| 2001/0021926 A1 | * | 9/2001 | Schneck et al. | 705/54 |

OTHER PUBLICATIONS

IBM, Tivoli SecureWay, Policy Director for Operating Systems, Administration Guide, Copyright IBM 2000, IBM, Version 3 Release 7,☐☐.*

* cited by examiner

*Primary Examiner*—Gilberto Barrón, Jr.
*Assistant Examiner*—Samson Lemma
(74) *Attorney, Agent, or Firm*—Jeffrey S. LaBaw; Darcell Walker (57) ABSTRACT

The method of the invention assumes there is a security manager and mechanism present for defining, attaching, and evaluating external authorization policy to file resources based on the file's path name. In this invention, protected symbolic links and the resources that the link points to are stored in a protected object database. When a system access attempt occurs, the file attribute is extracted from the file used in the access. The file attribute is then used to search the protected object database. If a matching system resource is found, and that resource is protected but does not have independent security policy on it, then the resource will have the security policy of a symbolic link that points to it. In this case, the security of each protected symbolic link pointing to the system resource has to grant access in order for allowance of the access attempt. This approach insures that the most restrictive outcome prevails.

24 Claims, 7 Drawing Sheets

Example High Level Architecture Relationship between an External Authorization Manager and the Described Symbolic Link Security Method

METHOD FOR ADDING EXTERNAL SECURITY TO FILE SYSTEM RESOURCES THROUGH SYMBOLIC LINK REFERENCES

FIELD OF THE INVENTION

The present invention relates generally to enhancing the security protections on accesses to file system resources on computer operating systems. More specifically, this invention describes a technique in which a defined authorization policy external to the native operating systems restricts access to a file system resource being accessed through a symbolic link file and controls the creation of new symbolic link access paths to a system resource.

BACKGROUND OF THE INVENTION

A symbolic link can be viewed as a file, which contains the name of the target to which it points. Symbolic links in computer operating systems are a powerful file system object type, which allow the creation of alternate names for file resources. For example, a file named /usr/bin/X11/xint might have a symbolic link called /bin/xinit. The link allows the file to be accessed as /bin/xinit instead of its primary name of /usr/bin/X11/xinit. Symbolic links are frequently exploited on UNIX platforms to create simplified or unified file tree name spaces. For example, it is common in UNIX distributions from different vendors to encounter slightly different locations for a small number of system utilities. Administrators can create symbolic links on the varying platforms such that a utility is accessible by the same name across all the implementations. In this example of creating a unified name space, the link on each system type points to the actual location of that utility on the system. The use of symbolic links can create various computing system configurations with respect to locating and referencing system resources. In one instance, with the use of symbolic links, there can be multiple symbolic links on a system pointing to the same system resource. In another instance with multiple machines, there can be symbolic links with the same name on each system where each link has a different name for its target. This case could even exist if the target is in fact the same functional entity. As an example, one system may have a link /bin/ftp which points to the primary name of /usr/sbin/ftp, while another system may have a link /bin/ftp which refers to /usr/lbin/ftp. In both cases, the link points to the utility ftp, which happens to reside in different directories on the two systems. However, with the symbolic link, /bin/ftp can be used universally to access the ftp program. The possibility also exists that on one system a name might be a symbolic link while another the name is in fact the actual resource (primary name), and not a link. Take the case of the above example with ftp and add a third system where /bin/ftp is in fact the actual ftp program.

Although the symbolic link is a very powerful tool, the symbolic link contains no security relative to its target. In other words, a user can have unrestricted access to file system resources through the symbolic link. With symbolic links, the security permissions on the target to which it points are applied when accessing the target via the link. If permissions are changed (chmod) against the link name, then the permission changes occur on the link's target, not the link. This happens within the underlying file system implementation. Once an alternate name is created for a resource using a symbolic link, it is common to manage the target via the link, since usually the link was created to provide a more convenient name.

Implementing an external security manager with respect to symbolic links that provides enhanced access controls and has the benefits of centralized cross platform security administration on UNIX file resources presents major security challenges. With an external security manager, extended security policy is attached to various system resources like files. The auxiliary policy might reside in a database local to the target system or perhaps somewhere in a network. In an enterprise security model, there would likely be a centralized policy database that acts as a security template for a large collection of subscribing systems. Optimally, policy would be administered and applied based on common resource names including symbolic link names for resources. Additionally, the creation of policy would be possible independent of access to the subscribing system(s) where the policy would be enforced. Symbolic links add security challenges because they create the potential for multiple names and therefore multiple access paths to a file system resource. On some systems, a resource name might be a symbolic link while on another it may not. On some systems, there may be many symbolic links all pointing to the same object. In addition, any user on a UNIX system has the ability to create a symbolic link and point it at a file system resource. Such a creation only requires the permission to create a file resource and this permission is not subject to any security restrictions with respect to the target until an access is attempted against the target. The existence of multiple names, symbolic links versus actual resources, and the unbounded creation of new names for a given resource reduces the effectiveness of an external security manager if the security administrator has to be responsible for understanding the details of symbolic link ramifications. If the administrator has to have knowledge of all links, which names were links versus actual resources, and actually know of all newly created links in order to apply security policy with an external security manager, then administration would be too complex and the potential for security exposures would be high. Therefore an external security manager must be capable of handling environments with symbolic links, such that at a minimum, an administrator can apply security policy on one name for a resource without regard for what type of resource. That policy should be enforced for that resource whether it is accessed by the name used in the policy, or accessed using an alternate name for the resource which might be a symbolic link, or potentially the primary name in the case of the protected name being a symbolic link.

In current computing file systems there is a need for a file system security policy that can identify symbolic links that represent protected system resources. This security policy should provide for placing protections on a file system resource by placing the protections on one or more symbolic links that point to the file system resource. This security means should be able to detect all protected symbolic links that point to a specific system resource. The security policy should have the ability determine whether a file system resource is the object of a protected symbolic link. This security policy should be able to detect access attempts to a protected file system resource through symbolic links that point to the resource, but are not listed with the security policy. This detection should result in enforcement of the protected resource's protections when the attempted access to the resource is through an unprotected symbolic link pointing to that protected resource.

SUMMARY OF THE INVENTION

It is an objective of the present invention to provide a method for controlling access to named objects in a file system.

It is a second objective of the present invention to provide a method for associating external attributes defining authorization policy to named objects in a file system.

It is another objective of the present invention to recognize the existence of an associated external file system resource authorization policy and provide for the processing of that policy at the time of access to the resource.

It is a fourth objective of the present invention to define a file element that will be present in any file name pointing to a system resource.

It is a fifth objective of the present invention to provide a technique to enable security policy to be defined for a file system resource using any of the possible names for that resource.

It is another objective of the present invention to allow for the processing of the externally defined policy by a resource manager based on associations to the original name without requiring the resource manager to have knowledge of the underlying association and recognition techniques for symbolic links.

It is another objective of the present invention to limit and restrict the creation of new symbolic links to the same system resource.

This invention describes a method for file system security through techniques that control access to the file system resources using externally stored attributes. This invention accomplishes the described objectives in file system security by creating an external database containing auxiliary attributes for objects in the file system. This solution incorporates techniques and algorithms for attribute attachment, storage and organization of the associations to these attributes, and subsequent recognition of attached attributes. In this approach, the attributes would define authorization policy for controlling access to objects in the file system. Such a solution would require techniques for associating the defined policy with file system objects, detecting accesses to the objects, locating the appropriate attributes at access time, and then processing the attributes to produce an access decision for granting or denying access to the accessed resource.

Administratively, the most convenient technique for defining authorization rules for a file system object is to associate the attributes with the object's fully qualified common name. This common name is also known as the path name to the file. UNIX file systems, for example, provide a hierarchical name space for constructing object names. For example, a file called mydata might have a fully qualified path of /home/john_doe/data_files/mydata. This path is the most recognizable representation of the object and the most convenient description for an administrator to use when defining new attributes for the object. Therefore the technique for associating (or attaching) attributes should support using the object's fully qualified pathname.

Recognizing and locating externally defined attributes for file system objects at the time of object access pose significant technical challenges. Accesses occur through a set of available programming Application Programming Interfaces ("APIs") that provide several ways to identify the object being accesses. For many APIs, the name of the object is provided. However, this name is often not the full path name starting from the top or "root" of the file hierarchy. Instead, the name is relative to a "current directory" that is tracked for the calling application by the native operation system. UNIX file systems also commonly contain support for creating alternate names to an object using symbolic or hard links. This provides alias names to the same object. A symbolic link might allow /home/john_doe/data_files/mydata to be accessed as /u/jdoes_data/mydata. These variations make it difficult to locate the externally defined attributes using the provided name at the time of access.

There are also APIs that do not take a pathname as input. Instead they take an integer number known as a file descriptor, which was obtained in an earlier name, based function. It is desirable to intervene in and enforce policy on these APIs as well.

The method of the invention assumes there is a security manager and mechanism present for defining, attaching, and evaluating external authorization policy to file resources based on the file's path name. An example file name would be: /usr/bin/ftp. In this invention, when security policy is attached to a file, a file resource protection manager is given the protected file's name. It then retrieves the file's attributes to determine if the file is a symbolic link. This retrieval could occur through one of several methods including a stat ( ) call or an internal operating system service such as vn_getattr( ). If the file is a protected symbolic link, the file system resource pointed to by the symbolic link is retrieved and both the symbolic link and the referenced file system resource are stored in the protected object database. This processing occurs for all files, which have attached security policy. When a system access attempt occurs, the file attributes are extracted from the file used in the access. The file attributes are then used to search the protected object database. If a matching system resource is found in the database and that resource has security policy attached to it, then authorization policy rules on that resource determine the access. If that resource is not directly protected, but does have one or more referencing symbolic links with attached security policy, then the resource will have the security policy of a symbolic link protections. In this case, the security of each protected symbolic link pointing to the system resource has to grant access in order for allowance of the access attempt. This approach insures that the most restrictive outcome prevails.

This invention describes a method to allow the attachment and enforcement of security policy to a file system resource via one or more symbolic link names for the target resource. This method allows the powerful administrative capability to attach security policy to a standardized name for a file resource when the resource's primary name is lesser known or may vary across the subscribing platforms. The standardized name exists on all applicable platforms either as the primary name or as a symbolic link. Without this capability, the administrator would have to know all the primary names and create policy for each name. In addition, a security hole could be exposed if one of the primary names is inadvertently missed.

DESCRIPTION OF THE DRAWINGS

FIG. 4 is a flow diagram of the steps involved in searching the protected object database for one or more entries which have protections associated with the provided object to search on.

DESCRIPTION OF THE INVENTION

This method involves the processing of protected file resources at the subscribing system where security policy is enforced. Each file resource is processed to determine its file type. For symbolic links, the target of the link is retrieved. The target resource is then processed as if it was part of the defined policy and is added to the local database of protection resources. A relationship is created between the target and the link so that the target becomes a child resource of the link and the link becomes a parent of the target. This processing occurs for all symbolic links yielding the potential of multiple entries for the target resource (child) with each entry having a different parent (symbolic link). There also could exist an entry for the target resource itself with directly attached protections. This entry would not have a parent (symbolic link) relationship. During intercepted file resource accesses, symbolic links are followed to the target resource. This is the typical access behavior in a UNIX system. Since the target resource has been added to the database of protected objects in the initial resources processing, it will be found. When the child resource is encountered, its parent link is followed to the symbolic link resource, which contains the relevant security rules for authorization checking. If multiple parent-child entries exist, then each found parent resource would be checked with the final access consisting of the most restrictive outcome. If the target resource has external security policy directly attached, then that policy acts as an overriding master policy dictating the resource access.

Figure 1:
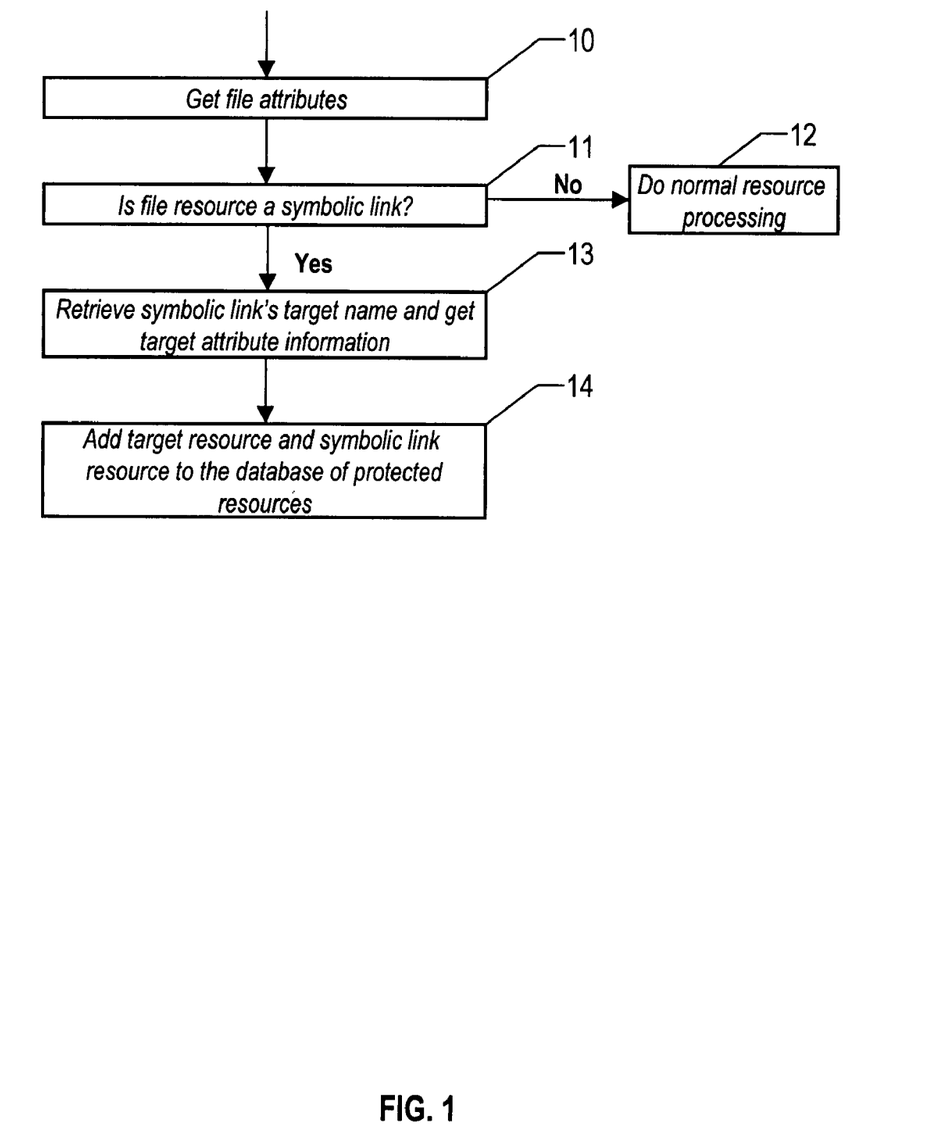
FIG. 1 is a flow diagram of the steps involved in incorporating a protected symbolic link and the system resource name in the symbolic link to a protected object database.

Referring to FIG. 1, the initial process of the invention is to establish a list of protected symbolic links in the security policy database. In this process, the native operating system scans each file for which external security protection is desired. For each scanned file, there has to be a determination of whether that file is a symbolic link file. For each scanned file, the first step 10 is to get the attributes of that file. The file attributes contain information about the file. One piece of information contain in the file attributes is whether the file is a symbolic link. Step 11 makes the determination of whether the file is a symbolic link. Since the methods of the present invention relate only to protection of symbolic link files, if the file is not a symbolic link, the methods of the present invention will not apply. In this case, the method moves to step 12 where this method would end with the normal processing of adding file resource as a protected resource in the database of protected resources. If step 11 determines that this file is a symbolic link, step 13 will retrieve the name of the target file pointed to by this symbolic link. Since the present file to be protected is a symbolic link, there is a desire to protect the underlying target file pointed to by this symbolic link. The symbolic link only contains the name of the target file, there is no independent reason to protect a symbolic link file apart from the underlying target file. Therefore, step 14 adds the symbolic link and target resource to the security database as protected resources. The target file will have the same security rules and protections applied to it that are applied to the symbolic link that points to this target file. The details of step 14 are further described in FIG. 2.

Figure 2:
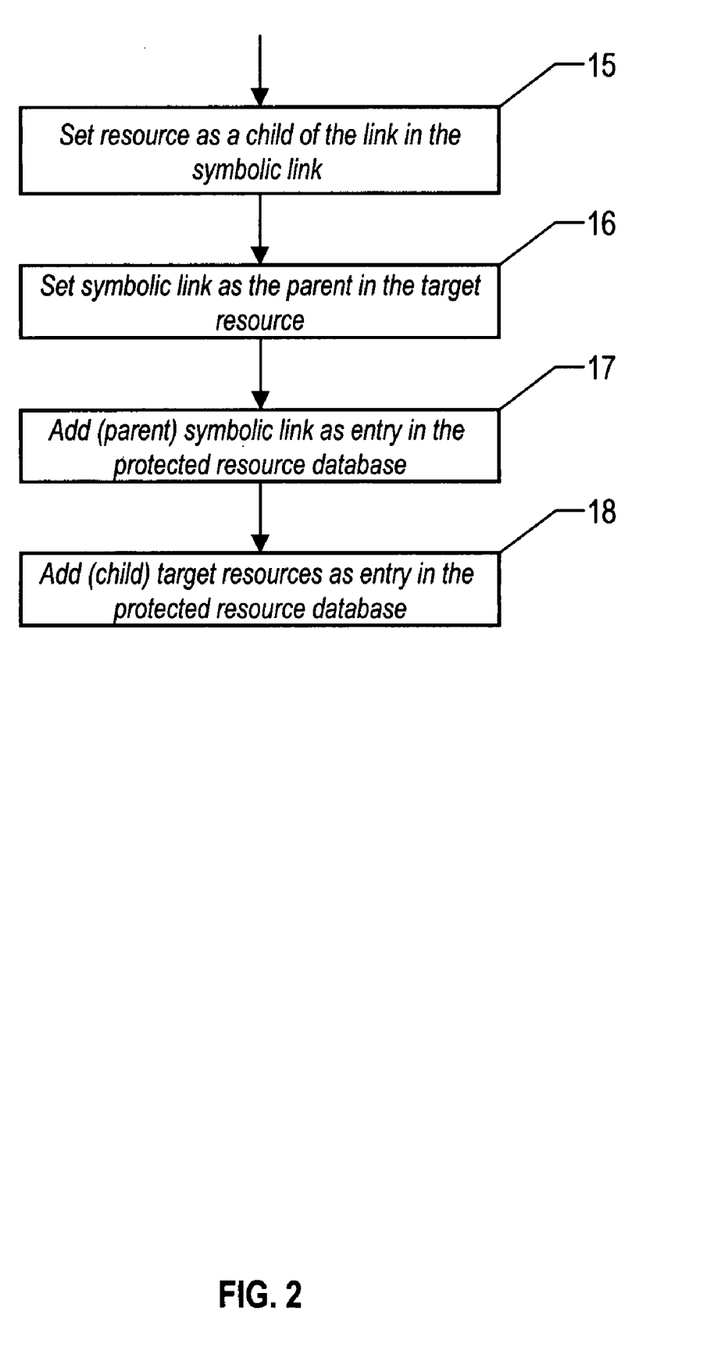
FIG. 2 is a flow diagram of the steps involved in establishing the symbolic link and system resource relationship in the protected database.

Referring to FIG. 2, the step of adding the target to the security database requires several steps. It is necessary to associate the target to the symbolic link that points to it. This association can be described in terms of a parent/child relationship. Step 15 sets the target resource as a child of the symbolic link. Step 16 sets the symbolic pointing to the target resource as the parent of that resource. Since this symbolic holds the desired protections for the child target resource, step 17 adds the symbolic link as an entry to the database of protected resources. This entry represents the protections for the file resource referred to by the symbolic link and also contains the child information. As previously mentioned, this method applies the protection of the symbolic link to the underlying resource named in the link. As a result, the method protects the target resource as well and adds it to the database of protected resources in step 18 as a child entry. The child entry contains the parent information necessary to find the entry for the symbolic link in the protected object database. At this point, the security database of protected resources has information about protected symbolic links and the target resources pointed to by the symbolic links.

Figure 3:
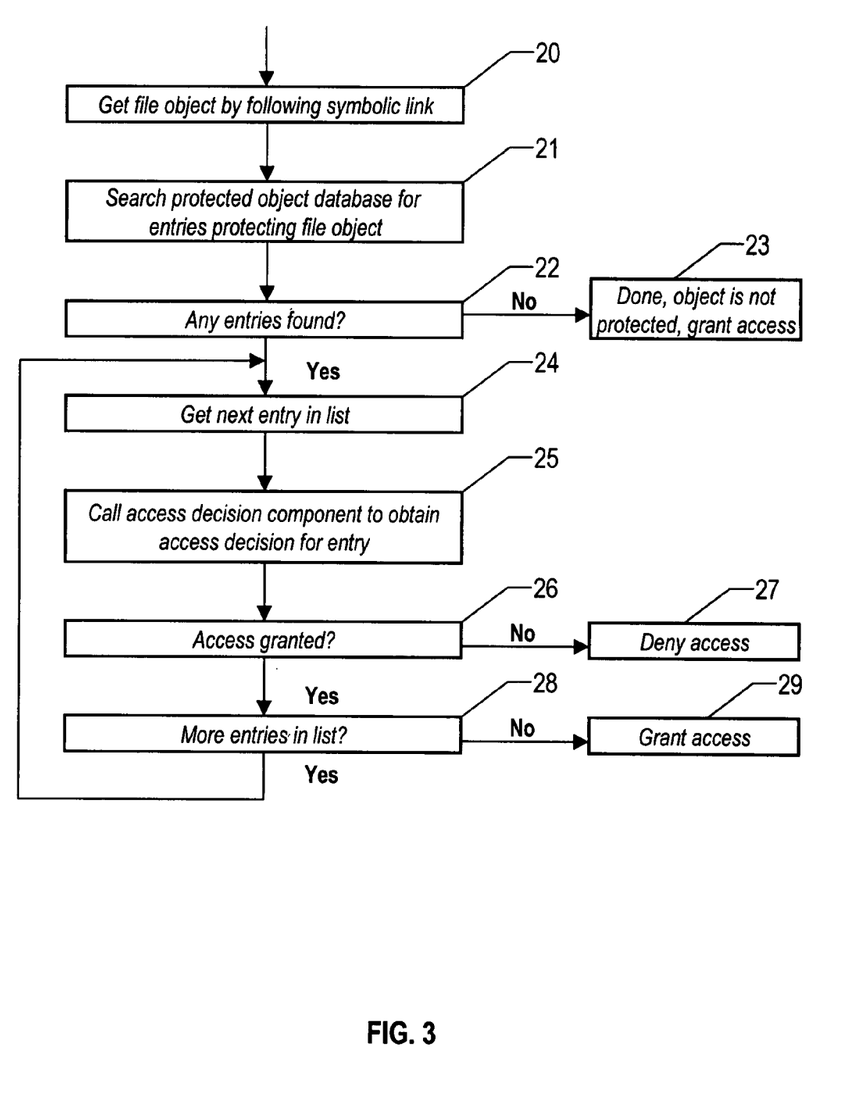
FIG. 3 is a flow diagram of the steps involved in processing an access attempt to a system resource through a symbolic link.

FIG. 3 illustrates the steps involved in the technique of the present invention to implement the external security policy rules on system access attempts through symbolic links. An example of a security policy rule is a restriction on when a certain or group can access a system resource. In this method, during a system access attempt, the file object information for the accessed resource is retrieved. The retrieved information will reveal that this file is a symbolic link, which points to a target resource. Step 20 locates the resource named in the symbolic link. After retrieving the object information for this target resource, the next step 21 is to search the protected database created in FIG. 1 for that target resource. If a search did not find the resource in the database step 22, this would mean that the target resource is not protected by the external security policy. Since there is no protection on this target resource, this method does not have relevance to the system security. In this instance, the method would terminate in step 23. If the search resulted is a found target resource/object, step 22, then this search result means that security policy does protect this resource.

From FIG. 1, a target resource listed in the protected object database could be the result of having the same protection as a protected symbolic link that points to the target resource. This result would mean that there are symbolic links in the protected object database and these symbolic links point to this object. When there are symbolic links in the protected database that point to the target resource, the method begins to check the security rules for each symbolic link. In this process, step 24 gets the first symbolic link (parent resource) produced in the search that points to the protected system resource. An access check is done with this parent resource. This access check involves obtaining an access decision 25 based on the security policy defined on the parent resource which is a symbolic link pointing to the actual object of the access attempt. If the security policy for this symbolic link denies the access attempt 26, then this process will deny the access attempt in step 27. If the security policy for this symbolic link allows the access attempt 26, then step 28 determines whether there are more symbolic links (parent links) in the list of entries generated from the protected object database that point to this actual object of the access attempt. As previously mentioned, there can be many symbolic links that point to the same system resource. If a security administrator in their security policy put security on five different names that are symbolic links that pointed to the same resource, there could potentially be five different security rules to what is believed to be five different resources. Conceptually, the system resource would have five different parents. Therefore, step 28 tries to determine whether there are any more parent links for this object of the access attempt. If there are more parent links to the object resource, the method retrieves the next parent resource in the protected database and the method returns to step 24 and repeats these steps for the next parent link in the protected database. If there are no more parent links, then, in step 29, the method will grant the access attempt. At this point, the method of the present invention has verified that the object resource of this access attempt has no direct security policy attached to it and that access checks on each protected symbolic link that points to this object have all granted access. The objective of this technique is to apply the most conservative protection to the access attempt. To accomplish this conservative protection during an access attempt of an object resource in which the access is through a protected symbolic link file, this invention seeks out all protected symbolic links to that object of the access attempt and requires that a file resource access attempt pass the security policy rules for each symbolic link that points to that object in order to grant the access request.

Figure 4:
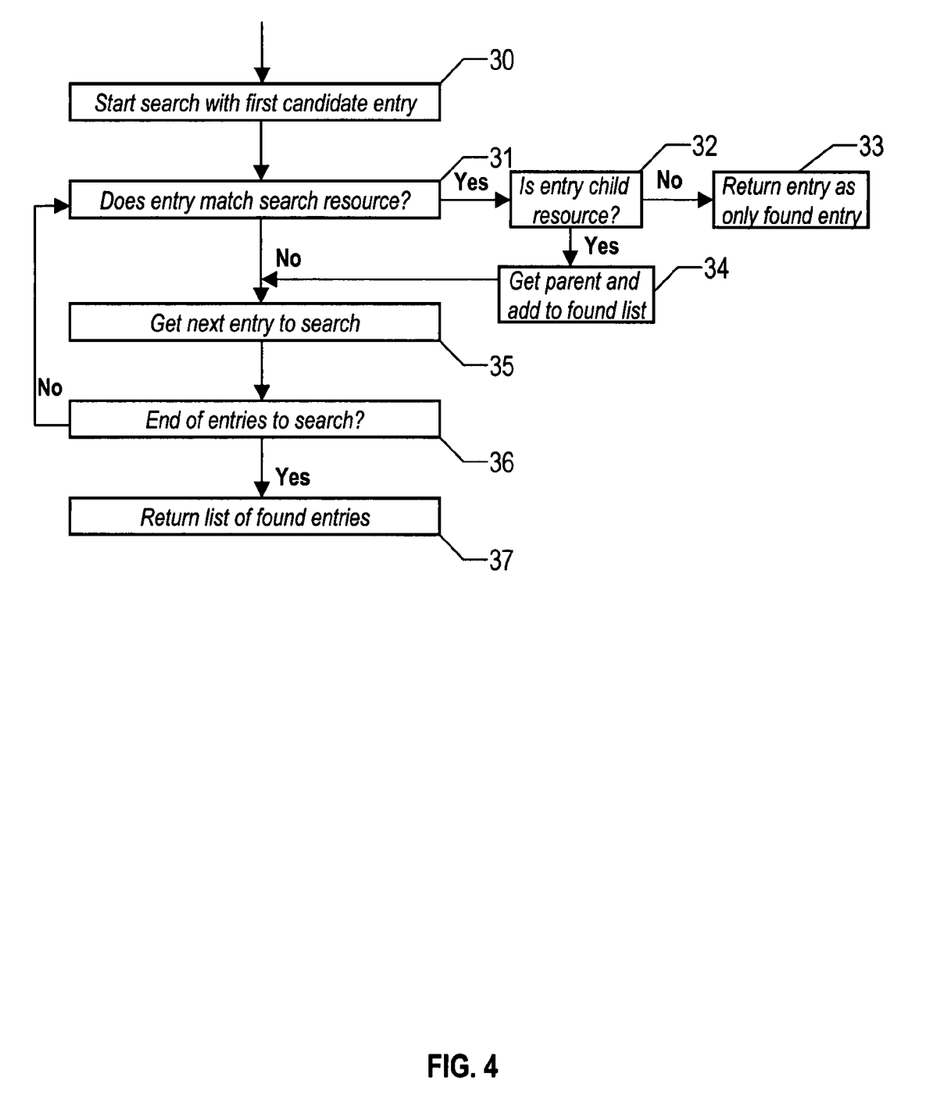

FIG. 4 describes the steps involved in searching the protected objects database for entries that name a target resource that is the same as the resource of the present access attempt. In step 30, the search of the protected objects database begins by retrieving the first database entry. The next step 31 compares the resource description in that database entry with the resource description of the present access attempt. If there is a match, then there is a determination of whether the database entry is named in a symbolic link, step 32. If this entry is not named in a symbolic link, then that entry has direct security attached to it. The security rules for this entry will govern the access attempt. In this case, step 33 would return a list containing the one found entry. If the entry were named in a symbolic link, the symbolic link naming this resource would be added to a found list containing symbolic link entries that name the resource, which is the subject of the access attempt 34. After adding the current entry to the found list, step 35 retrieves the next entry from the protected database. Step 36 determines if this entry is the end of the database list. If this entry is not the end, the method returns to step 31 and the process repeats steps 31, 32, 33, 34, 35 and 36. If the entry in step 36 is the end of the entries in the database, then the list of found entries is returned to the method of FIG. 3 as the search results 37.

Figure 5:
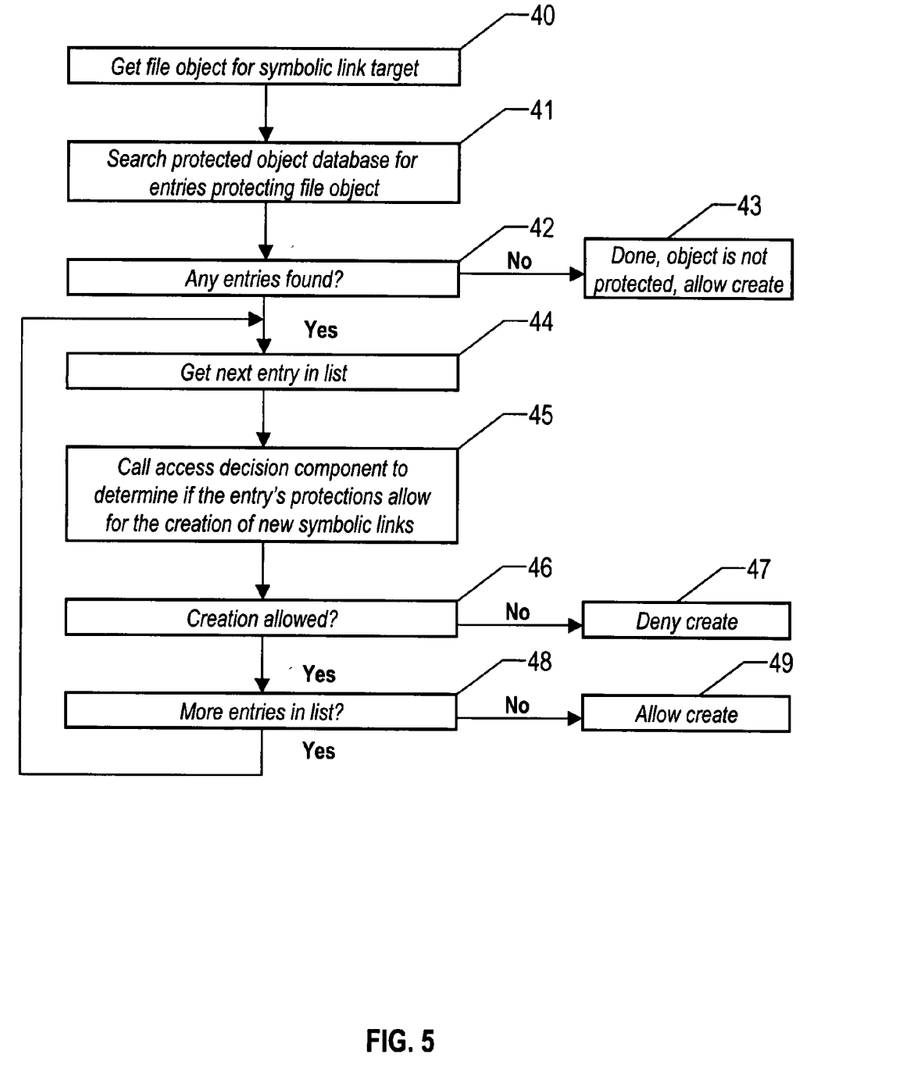
FIG. 5 is a flow diagram of the steps involved in checking to see if the creation of a symbolic link is allowed.

FIG. 5 illustrates the steps involved in detecting and controlling attempts to create symbolic links. When an attempt to create a symbolic link is detected, step 40 retrieves the file object for the target resource named in the proposed symbolic link. Next, step 41 performs a search of the protected object database for entries protecting the target resource. If the search does not find an entry protecting the named resource, step 42, then the named resource is not protected and step 43 allows the creation of the proposed symbolic link. If the search does find entry, then step 44 retrieves the entry. At this point, there is a determination 45 whether that entry's protections allow for the creation of a new symbolic link for that system resource. In this step, there is a call to the decision component of the external authorization engine. The decision will be based on the security rules that govern the particular database entry in step 44. If the decision is to allow the creation attempt 46, the next step is to determine if there are any more entries in the database 47. If there are more entries, then the method returns to step 44 and the process repeats for the next database entry. If there are no more entries and the decision component has allowed creation for all of the entries, then the creation attempt is allowed in step 48. If the decision in step 46 is to deny the attempt, then step 49 will deny the creation attempt.

Figure 6:
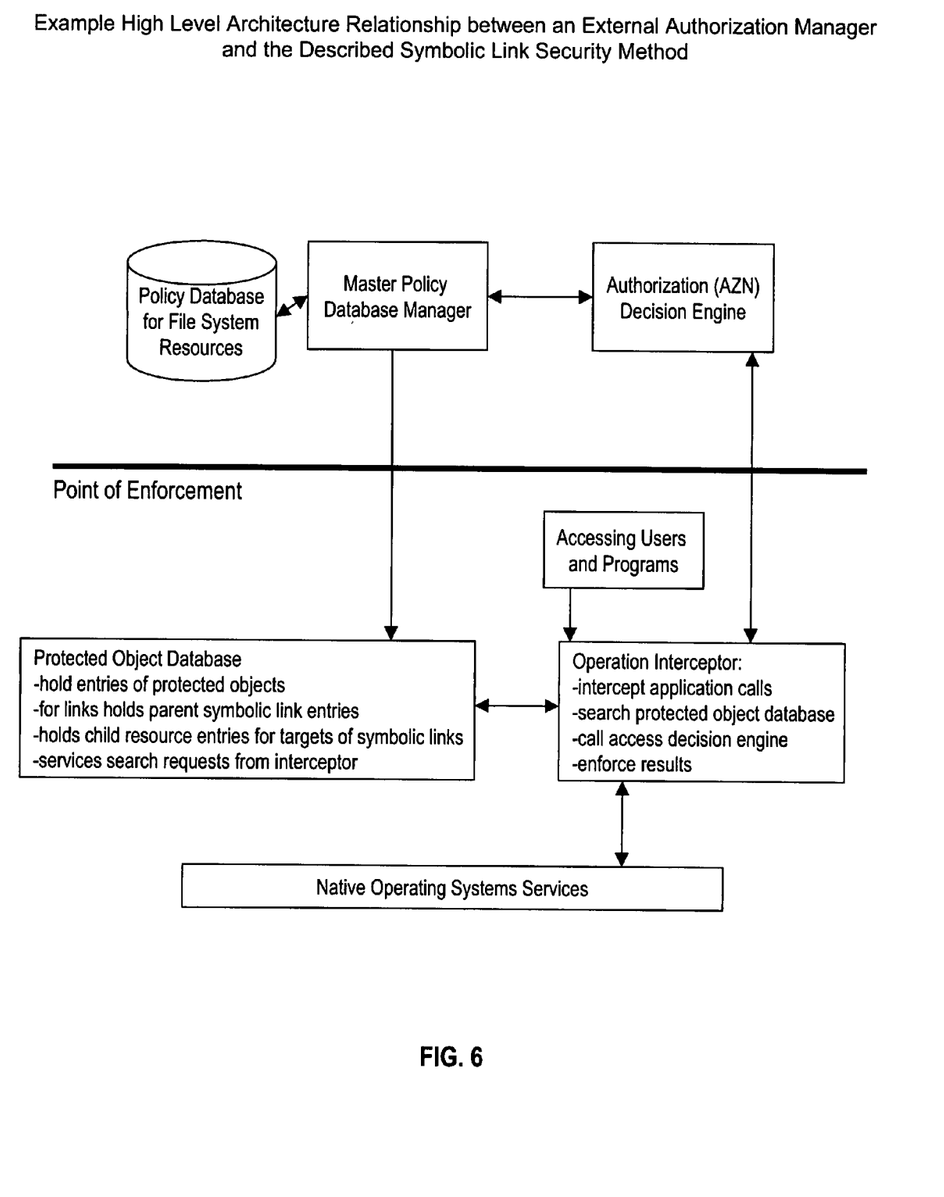
FIG. 6 is a high-level architecture diagram of an external resource manager incorporating the method of the present invention.

FIG. 6 illustrates the high-level architecture relationship between an authorization manager, a file system, and techniques of the present invention. In the architecture, Box 50 contains the protected object name (PON) database. Relevant algorithms would hold entries of protected objects, information for resources named in symbolic link entries, information for protected resources that have symbolic links and services that search requests from the interceptor. Box 51 contains the operation interceptor component of the authorization security manager that would intervene in operations accessing a resource through a symbolic link. Box 52 represents the applications that run on the system and users of the system that are accessing the protected system devices through symbolic links. Box 53 is the database for security policy for file system resources. This location is where the authorization policy and security rules reside. This database location could be a variety of places such as on a network computer or on the same system that enforces the rules. Box 54 represents a security access system decision engine. In this decision engine, logic actually exists that would take the input information and other information related to the access request and determine whether to grant the access request. This authorization decision engine at the implementation level is application dependent.

Figure 7:
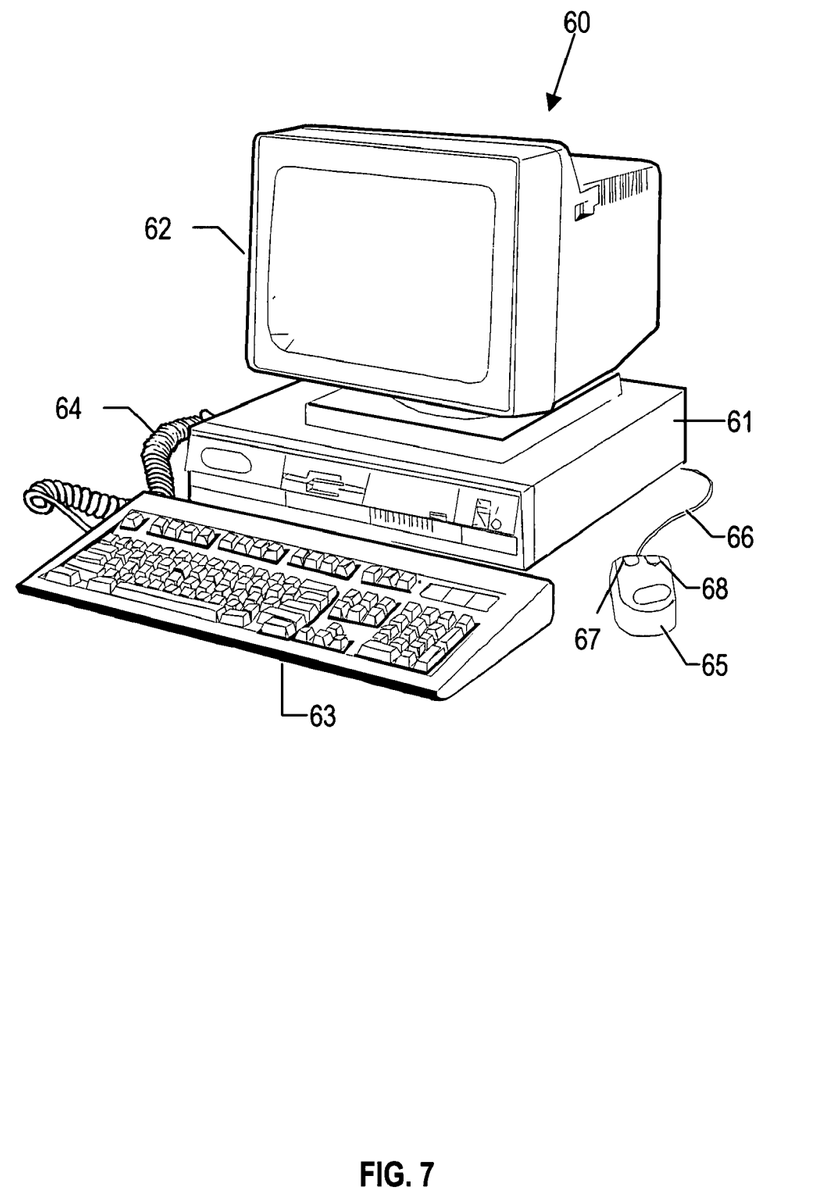
FIG. 7 is a pictorial representation of data processing system that may be used in implementation of the present invention.

FIG. 7 depicts a pictorial representation of data processing system 60 which may be used in implementation of the present invention. As may be seen, data processing system 60 includes processor 61 that preferably includes a graphics processor, memory device and central processor (not shown). Coupled to processor 61 is video display 62 which may be implemented utilizing either a color or monochromatic monitor, in a manner well known in the art. Also coupled to processor 61 is keyboard 63. Keyboard 63 preferably comprises a standard computer keyboard, which is coupled to the processor by means of cable 64. Also coupled to processor 61 is a graphical pointing device, such as mouse 65. Mouse 65 is coupled to processor 61, in a manner well known in the art, via cable 66. As is shown, mouse 65 may include left button 67, and right button 68, each of which may be depressed, or "clicked", to provide command and control signals to data processing system 60. While the disclosed embodiment of the present invention utilizes a mouse, those skilled in the art will appreciate that any graphical pointing device such as a light pen or touch sensitive screen may be utilized to implement the method and apparatus of the present invention. Upon reference to the foregoing, those skilled in the art will appreciate that data processing system 60 may be implemented utilizing a personal computer. It is important to note that while the present invention has been described in the context of a fully functioning data processing system, those skilled in the art will appreciate that the processes of the present invention are capable of being distributed in the form of instructions in a computer readable medium and a variety of other forms, regardless of the particular type of medium used to carry out the distribution. Examples of computer readable media include media such as EPROM, ROM, tape, paper, floppy disc, hard disk drive, RAM, and CD-ROMs and transmission-type of media.

We claim:

1. A method for controlling access to a computing system resource, being accessed through a symbolic link file, with an externally stored resource comprising the steps of:
   determining a system resource named in the symbolic link through which an access attempt is made;
   searching a protected objects database for entries protecting said system resource and generating a list of said entries; and
   generating an authorization decision for the access attempt based on security policies that govern all entries in the protected objects database that protect the system resource, the authorization decision being generated by retrieving a current entry from said generated database list; calling an access decision component of the externally stored resource to obtain an access decision for the access attempt based on the security policy that governs the current entry in the generated database list; determining whether the access decision component granted access; if the decision component granted access, determining whether more entries are in this database list;
   and updating a current entry in said database list when more entries are in the list and returning to said current entry retrieving step.

2. The method as described in claim 1 wherein said control method grants access if said search does not find in the protected objects database, the system resource named in the symbolic link through which the access attempt is made.

3. The method as described in claim 1 further comprising the step of denying the access attempt when the decision component denies access based on the security policy for the current database entry.

4. The method as described in claim 1 further comprising the step of allowing the access attempt if no more entries are in the database list.

5. The method as described in claim 1 wherein said searching step comprises the steps of:
   retrieving an entry from the protected objects database;
   comparing the name of the database entry to the name of the system resource that is an object of the access attempt;
   when there is a match between the database entry and the system resource name that is the object of the access attempt, determining whether the resource is named in a symbolic link that is listed in the protected object database; and
   generating a list containing the exact found entry, when the entry is not named in a symbolic link listed in the protected object database.

6. The method as described in claim 1 wherein said searching step comprises the steps of:
   retrieving an entry from the protected objects database;
   comparing the name of the retrieved database entry to the name of the system resource that is the object of the access attempt;
   when there is a match between the database entry and the name of the resource that is the object of the access attempt, determining whether the database entry is named in a symbolic link that is listed in the protected object database;
   adding said entry to a list containing found entries, when the entry is named in a symbolic link listed in the protected object database;
   determining whether there are more entries in the protected object database; and
   updating a current database entry in said database when more entries are in the database and returning to said current entry retrieving step.

7. The method as described in claim 1 wherein said searching step comprises the steps of:
   retrieving an entry from the protected objects database;
   comparing the name of the retrieved database entry to the name of the system resource that is the object of the access attempt;
   when there is a match between the database entry and the name of the resource that is the object of the access attempt, determining whether the database is named in a symbolic link that is listed in the protected object database;
   adding said entry to a list containing found entries, when the entry is named in a symbolic link listed in the protected object database;
   determining whether there are more entries in the protected object database; and
   returning the list containing found entries, when there are no more entries.

8. The method as described in claim 1 further comprising before said retrieving step the step of generating a protected objects database.

9. The method as described in claim 8 comprising the steps of:
   retrieving file attributes for a system resource file;
   determining from said retrieved file attributes whether said resource file is a symbolic link file;
   when resource file is a symbolic link, retrieving the name and attributes of the system resource named in the symbolic link; and
   adding the symbolic link and system resource named in the symbolic link to the protected objects database.

10. The method as described in claim 8 comprising the steps of:
    retrieving file attributes for a system resource file;
    determining from said retrieved file attributes whether said resource file is a symbolic link file; and
    terminating said method and processing the system resource file access attempt through other methods.

11. The method as described in claim 9 wherein said adding step comprises the steps of:
    setting the system resource named in the symbolic link as the child of the symbolic link;
    setting the symbolic link naming the resources as the parent of said resource; adding the symbolic link as an entry in the protected object database; and
    adding the named resource as an entry in the protected objects database.

12. A method for controlling access to a computing system device being accessed through symbolic link, said access control being implemented through an externally stored resource and comprising the steps of:
    monitoring the computing system for activities related to creating and accessing symbolic links that link to system resources;
    generating an authorization decision governing a symbolic link creation attempt or a symbolic link access attempt based on security policies that govern all entries in the protected objects database that protect the system resource, the authorization decision being generated by retrieving a current entry from said generated database list; calling an access decision component of the externally stored resource to obtain an access decision for the access attempt based on the security policy that governs the current entry in the generated database list; determining whether the access decision component granted access; if the decision component granted access, determining whether more entries are in this database list; and updating a current entry in said database list when more entries are in the list and returning to said current entry retrieving step;

restricting the creation of symbolic link files based on the rules defined in the externally stored resource; and restricting accesses to system resources that are linked to and accessed by a symbolic link.

13. A computer program product stored on a computer readable storage medium for controlling access to a computing system resource, being accessed through a symbolic link file, with an externally stored resource comprising:

instructions for determining a system resource named in the symbolic link through which the access attempt is made;

instructions for searching a protected objects database for entries protecting said system resources and generating a list of said entries; and instructions for generating an authorization decision for the access attempt based on the security policies that govern all entries in the database protecting the system resource, the authorization decision being generated by instructions retrieving a current entry from said generated database list; instructions calling an access decision component of the externally stored resource to obtain an access decision for the access attempt based on the security policy that governs the current entry in the generated database list; instructions determining whether the access decision component granted access; if the decision component granted access, instructions determining whether more entries are in this database list; and instructions updating a current entry in said database list when more entries are in the list and returning to said current entry retrieving step.

14. The computer program product as described in claim 13 further comprising instructions for denying the access attempt when the decision component denies access based on the security policy for the current database entry.

15. The computer program product as described in claim 13 further comprising instructions for allowing the access attempt if no more entries in the database list.

16. The computer program product as described in claim 13 wherein said searching instructions comprise:

instructions for retrieving an entry from the protected objects database;

instructions for comparing the name of the database entry to the name of a system resource that is the object of the access attempt;

instructions for when there is a match between the database entry and the name of the resource that is the object of the access attempt, determining whether the system resource is named in a symbolic link that is listed in the protected object database; and instructions for generating a list containing the exact found entry, when the entry is not named in a symbolic link listed in the protected object database.

17. The computer program product as described in claim 13 wherein said searching instructions comprise:

instructions for retrieving an entry from the protected objects database;

instructions for comparing the name of the database entry to the name of a system resource that is the object of the access attempt;

when there is a match between the database entry and the name of the resource that is the object of the access attempt, instructions for determining whether the database entry is named in a symbolic link that is listed in the protected object database;

instructions for adding said entry to a list containing found entries, when the entry is not named in a symbolic link listed in the protected object database;

instructions for determining whether there are more entries in the protected object database; and instructions for updating a current database entry in said database when more entries are in the database and returning to said current entry retrieving step.

18. The computer program product as described in claim 13 wherein said searching instructions comprise:

instructions for retrieving an entry from a protected objects database;

instructions for comparing the name of the retrieved database entry to the name of a system resource that is the object of the access attempt;

when there is a match between the database entry and the name of the resource that is the object of the access attempt, instructions for determining whether the database is named in a symbolic link that is listed in the protected object database;

instructions for adding said entry to a list containing found entries, when the entry is not named in a symbolic link listed in the protected object database;

instructions for determining whether there are more entries in the protected object database; and instructions for returning the list containing found entries.

19. The method as described in claim 18 further comprising before said retrieving instructions the instructions for generating a protected objects database.

20. A method for restricting the creation of a protected symbolic link that names a system resource comprising the steps of:

determining a system resource named in a proposed symbolic link;

searching a protected objects database for entries protecting said system resource named in the proposed symbolic link;

generating a list of file entries that contain the system resource named in a proposed symbolic link; and generating an authorization decision for the access attempt based on security policies that govern all entries in the protected objects database that protect the system resource, the authorization decision being generated by retrieving a current entry from said generated database list; calling a creation decision component of the externally stored resource to obtain a decision for the symbolic link creation attempt based on the security policy that governs the current entry in the generated database list; determining whether the creation decision component allows creation of a symbolic link; if the decision component allowed creation, determining whether more entries are in this database list; updating a current entry in said database list when more entries are in the list and returning to said current entry retrieving step.

21. The method as described in claim 20 wherein said restriction method allows a creation attempt if said search does not find in a protected objects database, the resource named in the proposed symbolic link.

22. The method as described in claim 20 further comprising the step of denying the creation attempt when the decision component denies the creation attempt based on the security policies that govern all entries in the database protecting the system resource.

23. The method as described in claim 20 further comprising the step of allowing the symbolic link creation attempt if no more entries in the database list.

24. The method as described in claim 20 further comprising before said retrieving step the step of generating a protected objects database.

* * * * *